US011057445B2

(12) United States Patent
Taibi et al.

(10) Patent No.: US 11,057,445 B2
(45) Date of Patent: Jul. 6, 2021

(54) METHOD FOR ADAPTING THE DOWNLOADING BEHAVIOR OF A CLIENT TERMINAL CONFIGURED, TO RECEIVE MULTIMEDIA CONTENT, AND CORRESPONDING TERMINAL

(71) Applicant: INTERDIGITAL VC HOLDINGS, INC., Wilmington, DE (US)

(72) Inventors: Charline Taibi, Chartres de Bretagne (FR); Remi Houdaille, Cesson Sevigne (FR); Stephane Gouache, Cesson Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 899 days.

(21) Appl. No.: 14/901,049

(22) PCT Filed: Jun. 12, 2014

(86) PCT No.: PCT/EP2014/062220
§ 371 (c)(1),
(2) Date: Dec. 27, 2015

(87) PCT Pub. No.: WO2014/206749
PCT Pub. Date: Dec. 31, 2014

(65) Prior Publication Data
US 2017/0126765 A1 May 4, 2017

(30) Foreign Application Priority Data

Jun. 28, 2013 (EP) .................................... 13305910

(51) Int. Cl.
*G06F 15/16* (2006.01)
*H04L 29/06* (2006.01)
*H04L 29/08* (2006.01)

(52) U.S. Cl.
CPC ...... *H04L 65/4084* (2013.01); *H04L 65/4092* (2013.01); *H04L 65/608* (2013.01);
(Continued)

(58) Field of Classification Search
CPC ... H04L 65/4084; H04L 65/608; H04L 67/02; H04L 6/2842; H04L 67/2842; H04L 65/4092; H04L 65/80
(Continued)

(56) References Cited

U.S. PATENT DOCUMENTS 6,067,545 A * 5/2000 Wolff .................. H04L 67/1008
8,036,227 B2 10/2011 Zuberi et al.
(Continued)

FOREIGN PATENT DOCUMENTS

CN 101938508 1/2011
CN 102333089 1/2012
(Continued)

OTHER PUBLICATIONS

Jiangchuan Liu, et al., "Proxy cache management for fine-grained scalable video streaming", IEEE INFOCOM 2004, , , , IEEE INFOCOM 2004, 2004.
(Continued)

*Primary Examiner* — Kaylee J Huang
(74) *Attorney, Agent, or Firm* — Volpe Koenig

(57) ABSTRACT

The invention concerns a method for adapting the downloading behavior of a client terminal configured to receive a multimedia content from at least one server, said multimedia content being defined by at least one representation, wherein it comprises the steps of: requesting (S0) a first part of said multimedia content with a given representation; detecting (S1) if a cache between is located along the transmission path the client terminal and a server, based on the request of said first part; in case (S3) a cache is detected, requesting a
(Continued)

second part of said multimedia content with a representation depending on at least one performance criterion.

14 Claims, 5 Drawing Sheets

(52) U.S. Cl.
CPC .............. *H04L 65/80* (2013.01); *H04L 67/02* (2013.01); *H04L 67/2842* (2013.01)

(58) Field of Classification Search
USPC .......................... 709/219, 217, 218, 230, 231
See application file for complete search history.

(56) References Cited

U.S. PATENT DOCUMENTS

| | | | |
|---|---|---|---|
| 8,086,736 B2 | 12/2011 | Omino et al. | |
| 8,966,088 B2 | 2/2015 | Wilf et al. | |
| 8,973,077 B2 | 3/2015 | Huysegems et al. | |
| 2007/0081461 A1* | 4/2007 | Denecheau | H04L 12/42 370/231 |
| 2008/0209053 A1 | 8/2008 | Shen et al. | |
| 2009/0138538 A1 | 5/2009 | Klein | |
| 2010/0235472 A1* | 9/2010 | Sood | H04L 65/4092 709/219 |
| 2012/0265856 A1 | 10/2012 | Major et al. | |
| 2013/0185759 A1 | 7/2013 | Huysegems et al. | |

FOREIGN PATENT DOCUMENTS

| | | |
|---|---|---|
| EP | 2525587 | 11/2012 |
| JP | 2008527761 A | 7/2008 |
| JP | 2013535892 A | 9/2013 |
| JP | 2014519259 A | 8/2014 |
| TW | 200534625 A | 10/2005 |
| WO | WO2006100684 | 9/2006 |
| WO | 2011038013 A2 | 3/2011 |
| WO | WO2014062921 | 4/2014 |

OTHER PUBLICATIONS

Rejaie, R., et al., "Multimedia proxy caching mechanism for quality adaptive streaming applications in the Internet", Proceedings IEEE INFOCOM 2000. Conference on Computer Communications. Nineteenth Annual Joint Conference of the IEEE Computer and Communications Societies (Cat. No.00CH37064), , , , Proceedings IEEE INFOCOM 2000. Conference on Computer Communications. Nineteenth Annual Joint Conference of the IEEE Computer and Communications Societies, 2000.

Dejian Ye, et al., "A buffer-driven approach to adaptively stream stored video over Internet", 5th IEEE International Conference on High Speed Networks and Multimedia Communication (Cat. No.02EX612), , , , HSNMC '02—5th International Conference on High-Speed Networks and Multimedia Communications, 2002.

R. Pantos: "HTTP Live Streaming," IETF, Internet-Draft Version 5 (draft-pantos-http-live-streaming-05), Nov. 2010, work in progress.

T. StockHammer: "Dynamic adaptive streaming over HTTP -standards and design principles", in Proc. Of the 2011 ACM Conference on Multimedia Systems (MMSysE 2011), Feb. 2011, pp. 157-168.

"IIS smooth streaming technical overview." [Online]. Available: http://www.microsoft.com/downloads/details.aspx?displaylang=en &FamilyID=03d22583-3ed6-44da-8464-b1b4b5ca7520.

"HTTP dynamic streaming on the Adobe Flash platform." [Online]. Available: http://www.adobe.com/products/httpdynamicstreaming/ pdfs/httpdynamicstreaming wp ue.pdf.

Sanchez et al., "iDASH: Improved Dynamic Adaptive Streaming over HTTP using Scalable Video Coding," MMSys'11, San Jose, California, US (Feb. 23-25, 2011).

* cited by examiner

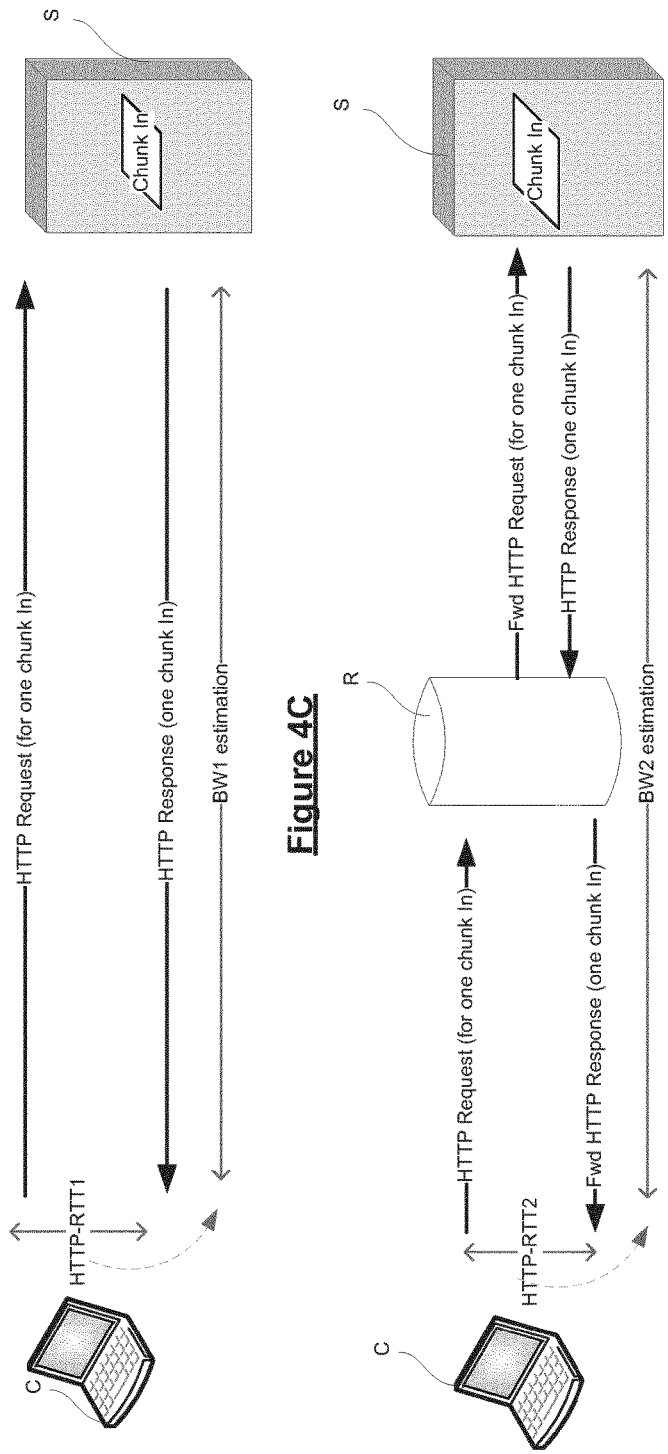
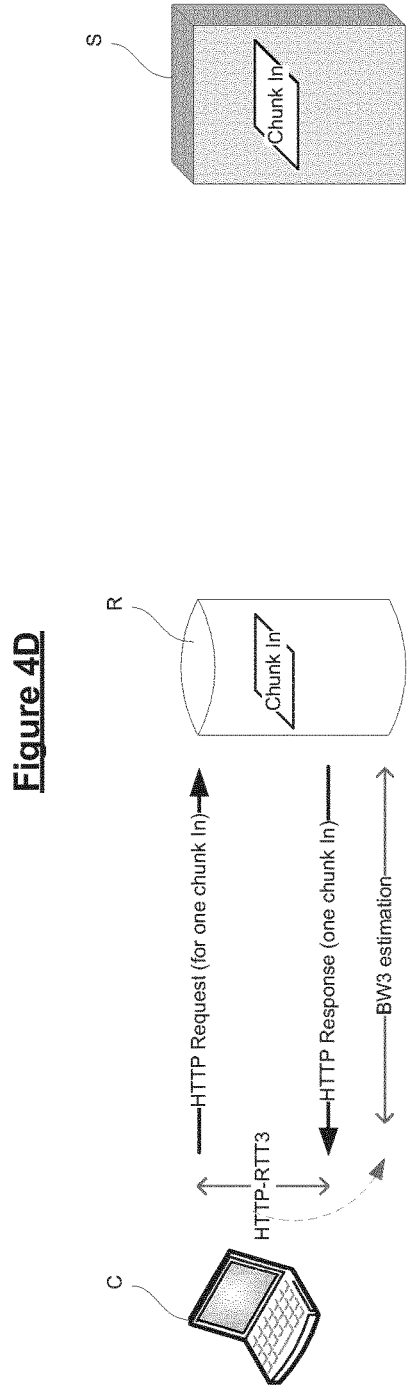
Figure 4C
Figure 4D
Figure 4E

METHOD FOR ADAPTING THE DOWNLOADING BEHAVIOR OF A CLIENT TERMINAL CONFIGURED, TO RECEIVE MULTIMEDIA CONTENT, AND CORRESPONDING TERMINAL

This application claims the benefit, under 35 U.S.C. § 365 of International Application PCT/EP2014/062220, filed Jun. 12, 2014, which was published in accordance with PCT Article 21(2) on Dec. 31, 2014 in English and which claims the benefit of European patent application No. 13305910.5, filed Jun. 28, 2013.

FIELD OF THE INVENTION

The present invention relates generally to the domain of the adaptive streaming technology over, for instance but not exclusively, HTTP (HyperText Transfer Protocol) and, in particular, to a method for adapting the downloading behavior of a client terminal configured to receive a multimedia content from one or several servers.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Adaptive streaming over HTTP is quickly becoming a major technology for multimedia content distribution. Among the HTTP adaptive streaming protocols which are already used, the most famous are the HTTP Live Streaming (HLS) from Apple, the Silverlight Smooth Streaming (SSS) from Microsoft, the Adobe Dynamic Streaming (ADS) from Adobe and the Dynamic Adaptive Streaming over HTTP (DASH) developed by 3GPP within the SA4 group.

When a client terminal wishes to play an audiovisual content (or A/V content) in adaptive streaming, it first has to get a file describing how this A/V content might be obtained. This is generally done through the HTTP protocol by getting a descripting file, so-called manifest, from an URL (Uniform Resource Locator), but can be also achieved by other means (e.g. broadcast, e-mail, SMS and so on). The manifest basically lists the available representations of such an A/V content (in terms of bitrate, resolution and other properties). Said manifest is generated in advance and delivered to the client terminal by, for instance, a remote server.

Indeed, the stream of data corresponding to the A/V content with different qualities is available on an HTTP server. The highest quality is associated with a high bit rate, the lowest quality is associated with a low bit rate. This allows distribution to many different terminals which might be subject to highly varying network conditions.

The whole data stream is divided into chunks which are made such that a client terminal may smoothly switch from one quality level to another between two chunks. As a result, the video quality may vary while playing but rarely suffers from interruptions (also called freezes).

Depending on the protocol, the manifest can present various formats. For the Apple HLS protocol, it is an M3U8 playlist, called the "master playlist". Each element of this playlist is another playlist, one per representation. According to other protocols (DASH for instance), the manifest is made of one or more XML files describing all the representations one after the other. In any case, creating the manifest is as simple as creating a text file and writing the text according to a deterministic grammar.

It is well-known that, according to its available bandwidth, a client terminal chooses the best representation at a given point in time to optimize the tradeoff between the quality (e.g. video quality) and the robustness to network variations. The available bandwidth is determined dynamically, at every received chunk. Indeed, the Round Trip Time defined between the emission of an HTTP request for a given chunk and the reception of the corresponding HTTP response (called hereinafter HTTP RTT) is commonly measured and used to estimate the available bandwidth along the transmission path.

The reception rate at the client side varies in time when downloading a chunk. At starting time, the client terminal issues an HTTP request for a chunk. There is first a period of "idle" time corresponding to the HTTP RTT of said HTTP request. Then, packets of the chunk are received. These packets come at the peak rate of the connection. Finally, the reception rate falls again to zero when the downloading of the chunk is finished.

The client terminal is thus able to estimate both the HTTP RTT of an HTTP request and the available peak bandwidth, and then uses these estimated values to determine the maximum chunk size that might be requested with a high probability of being received within the duration of one chunk.

As already known, client terminals typically average the bandwidth estimation thanks to the following formula:

$$BW_n = \alpha BW_{n-1} + (1-\alpha) D_n$$

wherein:

$BW_n$ is the averaged bandwidth for a chunk n, used for a next chunk n+1 request, $D_n$ is the instantaneous received data rate of chunk n (between start and end of chunk n transmission), $\alpha$ is such that $0 \leq \alpha \leq 1$.

Moreover, client terminals also use some buffers to protect against sudden lack of bandwidth. To fill the buffer, such terminals request chunks small enough to be received in shorter time than the chunk duration, asking the next chunk as soon as the previous one was received. When the buffer is at its normal size, the client terminal tries to load chunks that fit the chunk duration. If some chunk loads too slowly, the buffer is consumed and the client terminal will try to fill it again with following chunks.

When a cache is located along the transmission path between a client terminal and a remote server which frequently occurs, one chunk may be already stored in said cache, in case another client has previously requested the same chunk with the same representation or in case a Content Delivery Network (CDN) has already provisioned the chunk in the cache.

Thus, the response to an HTTP request for said given chunk is faster than if the chunk comes from the remote server. The HTTP RTT of the HTTP request between the client terminal and the cache may be much smaller than the one between the client terminal and the remote server, since the transmission path is shorter.

In addition, in case of the presence of a cache along the transmission path (the requested chunk being stored in the cache), the peak rate may be better, especially when there is a congestion on said transmission path, located between the cache and the remote server.

Since a client terminal does usually not differentiate replies sent by a remote server or by an intermediate cache, it is mistakenly interpreting a bandwidth variation as a variation of the end-to-end network conditions, while it is in fact observing a switch of transmission path from the "client terminal to server" path to the "client terminal to cache" path.

Consequently, the bandwidth estimation performed by the client terminal is overestimated and does not accurately reflect the end-to-end transmission path characteristics as expected.

Such an overestimation generally leads to a poor experience for the end user. Indeed, if the estimated bandwidth is higher than expected, the adaptive streaming client terminal usually requests a chunk from a higher quality representation (for instance higher bit rate). This requested chunk has thus a lower probability to be in a cache (by assuming that the cache was filled by a previous client terminal playing the same multimedia content at a constant bit rate) as the representation changes. The downloading time associated with said requested chunk should be much longer than expected, resulting of a too late arrival of the requested chunk. The client terminal will then switch back to a lower quality representation, which is likely to be found in the cache again.

As a consequence, the client terminal is switching back and forth between high and low quality chunks—constantly interrupted due to cache misses—which completely jeopardizes the benefits of caching.

The present invention attempts to remedy at least some of the above mentioned concerns for improving the quality of end user experience.

SUMMARY OF THE INVENTION

The invention concerns a method for adapting the downloading behavior of a client terminal configured to receive a multimedia content from at least one server, said multimedia content being defined by at least one representation, which is remarkable in that it comprises, preferably at the client side, the steps of:

requesting a first part of said multimedia content with a given representation;

detecting if a cache is located along the transmission path between the client terminal and a server, based on the request of said first part;

in case a cache is detected, requesting a second part of said multimedia content with a representation depending on at least one performance criterion.

Thus, thanks to the present invention, the adaptation of the downloading behavior of a client terminal in presence of intermediate cache(s) can avoid erratic playback and can restore the possibility to leverage the vast amount of deployed caches. In fact, most HTTP Adaptive Streaming servers send the chunk data with "no-cache" headers to prevent caching, in order to avoid client terminals to be confused in their bandwidth estimation when some chunks are cached and others not cached. The present invention can bring back the caching benefits to the entire client server architecture, improving the overall network performance.

Preferably, said method further comprises a step of estimating the bandwidth of the transmission path between the client terminal and the detected cache.

According to said performance criterion, the requested second part of said multimedia content can be defined with:

either the same representation as the one of the first part stored in said detected cache, whatever the result of the bandwidth estimation;

or an alternative representation taking into account the estimated bandwidth, said new representation being different from the representation of the first part.

Moreover, the request of said second part can advantageously comprise a piece of information understandable by said detected cache, so that, in case said second part is not stored in the detected cache, the client terminal receives a message specifying that said second part is unavailable from said cache. For instance, such piece of information might be the directive "only if cached" in the control header of an HTTP request.

In another aspect, said method can further comprise, in case the downloading of said multimedia content from the detected cache meets at least one downloading criterion, a step of requesting a further part of said multimedia content with a new representation, which differs from the representation of said first part.

According to a preferred embodiment of the present invention, the step of detecting a cache further comprises a step of determining the round trip time for a connection establishment request from the client terminal to a server.

In addition, the step of detecting a cache further can comprise a step of measuring the reception delay between the emission of a request for the first part of the multimedia content and the beginning of the reception of said requested first part.

Moreover, the step of detecting a cache can further comprise a step of comparing the determined round trip time of the connection establishment request and the measured reception delay.

In a further aspect of the preferred embodiment, in case the difference between the measured reception delay and the determined round trip time of the connection establishment request is:

at least equal to a first detection threshold, then a cache is detected along the transmission path between the client terminal and the server, without storage of the requested first part in said detected cache;

otherwise:
  either a cache is present along the transmission path between the client terminal and the server, and the requested first part comes from the cache;
  or there is no cache along the transmission path between the client terminal and the server, and the requested first part comes from the server.

As a variant or a complement of the preferred embodiment, the step of detecting a cache can further comprise the steps of:

measuring the response time between the emission of an echo request from the client terminal to a server and the reception of a response to said echo request;

comparing the determined round trip time of the connection establishment request with the response time.

Besides, the step of detecting a cache can further comprise the step of comparing the measured response time with the measured reception delay.

According to an additional aspect of this variant or complement, in case the difference between the measured response time and the determined round trip time of the connection establishment request is:

at most equal to a second detection threshold, no cache is detected along the transmission path between the client terminal and the server, the chunk comes from the server;

at least equal to a third detection threshold, a cache is detected along the transmission path between the client terminal and the server, and the chunk is:

loaded in the detected cache, in case the difference between the measured response time with the measured reception delay is at least equal to a fourth detection threshold; or comes from the server should the opposite occur.

In a further aspect, said performance criterion might belong to the group of criteria comprising at least:

a criterion related to the quality of the multimedia content;

a criterion related to the speed of downloading of the multimedia content.

The present invention further concerns a terminal configured to adapt its downloading behavior for receiving a multimedia content from at least one server, said multimedia content being defined by at least one representation. According to the invention, said terminal comprises:

a communication module for requesting a first part of said multimedia content with a given representation;

a cache detector for detecting if a cache is located along the transmission path between the client terminal and a server, based on the request of said first part;

a decision module for requesting, in case a cache is detected, a second part of said multimedia content with a representation depending on at least one performance criterion.

Additionally, said terminal can further comprise a bandwidth estimator for estimating the bandwidth of the transmission path between said terminal and the detected cache.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

FIGS. 4C, 4D and 4E show the HTTP-RTT without cache (FIG. 4C) and with a cache (FIGS. 4D and 4E) along the transmission path, the given chunk being either not cached (FIG. 4D) or cached (FIG. 4E);

In FIGS. 1 and 2, the represented blocks are purely functional entities, which do not necessarily correspond to physically separate entities. Namely, they could be developed in the form of software, hardware, or be implemented in one or several integrated circuits, comprising one or more processors.

Wherever possible, the same reference numerals will be used throughout the figures to refer to the same or like parts.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

According to a preferred embodiment, the present invention is depicted with regard to the HTTP adaptive streaming protocol. Naturally, the invention is not restricted to such a particular environment and other adaptive streaming protocol could of course be considered and implemented.

Figure 1:
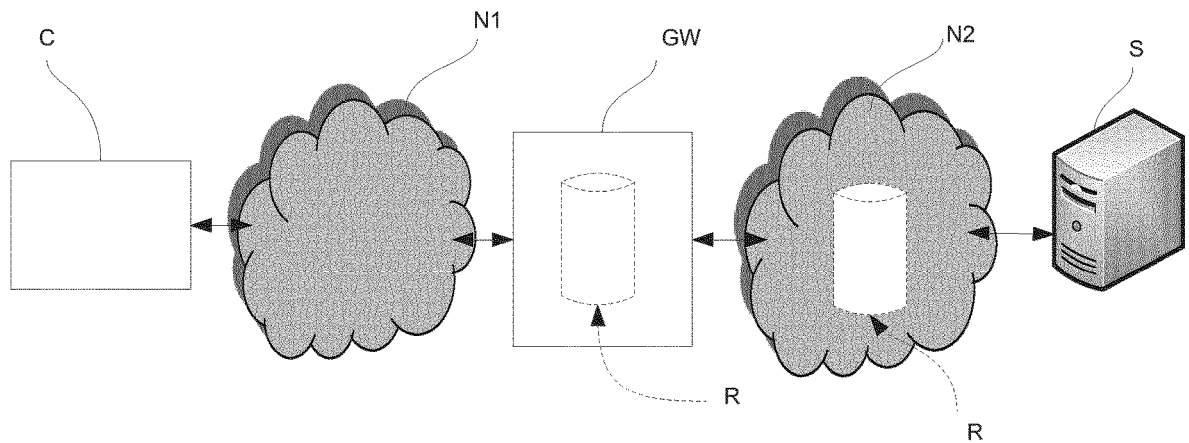
FIG. 1 is a schematic diagram of a Client-Server network architecture wherein the present invention might be implemented.

As depicted in FIG. 1, the Client-Server network architecture, wherein the present invention might be implemented, comprises a client terminal C, a gateway GW and one or more HTTP servers S (only one is represented on FIG. 1).

The client terminal C—connected to the gateway GW through a first network N1 (as a home network or an enterprise network)—wants to connect to a HTTP server S through a second network N2 (as the Internet network). The first network N1 is connected to the second network N2 thanks to the gateway GW.

The HTTP server S streams chunks to the client terminal C, upon the client request, using HTTP adaptive streaming protocol over one or more TCP/IP connections.

Figure 2:
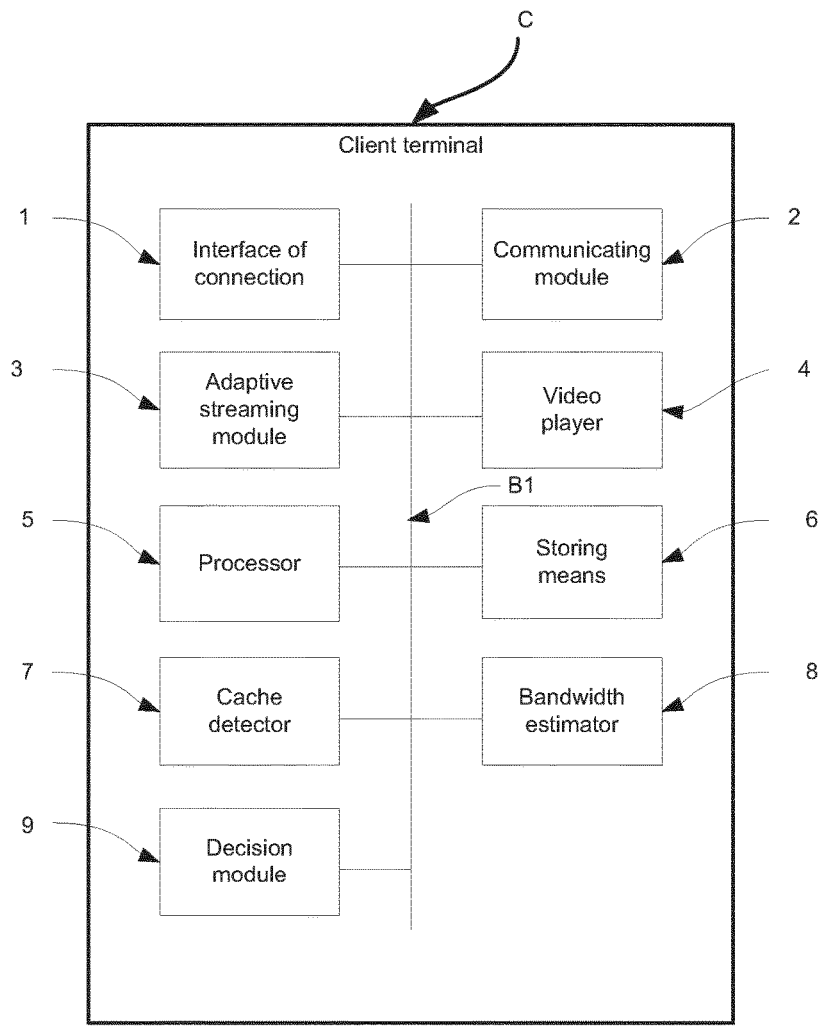
FIG. 2 is a block diagram of an example of a client terminal according to a preferred embodiment of the present invention.

According to the preferred embodiment as described in FIG. 2, the client terminal C comprises at least:

an interface of connection 1 (wired and/or wireless, as for example Wi-Fi, Ethernet, etc.) to the first network N1;

a communication module 2 containing the protocol stacks to communicate to the HTTP server S. In particular the communication module 2 comprises the TCP/IP stack well known in the art. Of course, it could be any other type of network and/or communicating means enabling the client terminal C to communicate to the HTTP server S;

an adaptive streaming module 3 which receives the HTTP streaming multimedia content from the HTTP server S. It continually selects the chunk at the bit rate that better matches the network constraints and its own constraints;

a video player 4 adapted to decode and render the multimedia content;

one or more processor(s) 5 for executing the applications and programs stored in a non-volatile memory of the client terminal C;

storing means 6, such as a volatile memory, for buffering the chunks received from the HTTP server S before their transmission to the video player 4;

an internal bus B1 to connect the various modules and all means well known to the skilled in the art for performing the generic client terminal functionalities.

In the preferred embodiment, the client terminal C is a portable media device, a mobile phone, a tablet or a laptop. Naturally, the client terminal C might not comprise a complete video player, but only some sub-elements such as the ones for demultiplexing and decoding the media content and might rely upon an external means to display the decoded content to the end user. In this case, the client terminal C is a HTTP Adaptive Streaming (HAS) capable video decoder, such as a set-top box.

According to the invention, the client terminal C is configured to adapt its downloading behavior for receiving a multimedia content from a server S.

To this end, the client terminal C further comprises:
- a cache detector 7 adapted to detect a cache along the transmission path between the client terminal C and a server S;
- a bandwidth estimator 8 configured for determining the bandwidth of the transmission path between the client terminal C and a detected cache R and/or the bandwidth of the transmission path between the client terminal C and a server S;
- a decision module 9 configured for requesting chunks of said multimedia content according to a performance criterion. In a variant, the decision module 9 might be integrated either into the communication module 2 or into the adaptive streaming module 3.

Figure 3:
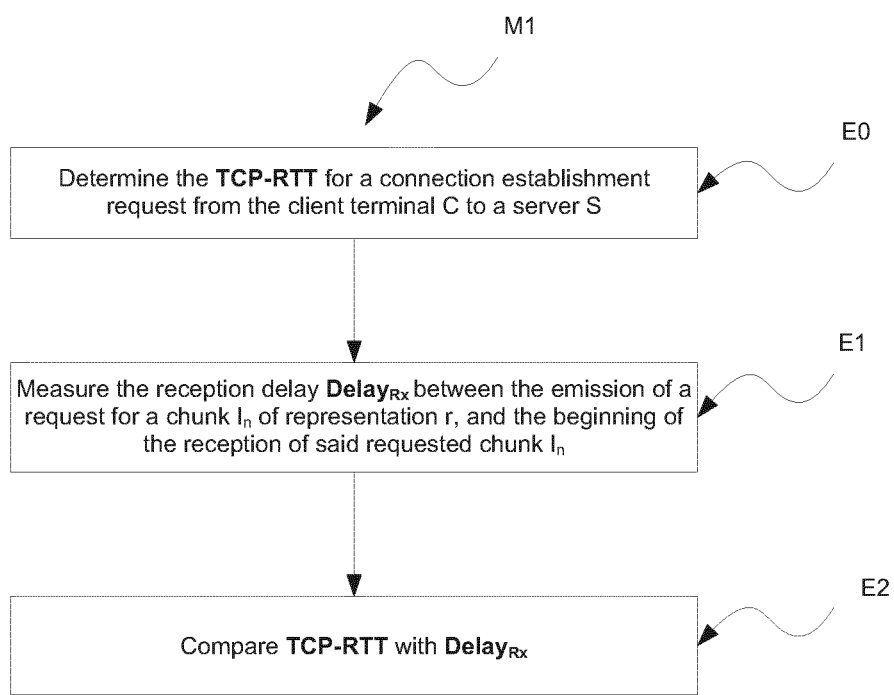
FIG. 3 is a flow chart depicting a first cache detection mechanism implemented by the client terminal of FIG. 2.

In particular, according to said preferred embodiment, the cache detector 7 of the client terminal C implements a first mechanism M1 for detecting a cache R between the client terminal C and a server S, as represented in FIG. 3.

The first cache detection mechanism M1 comprises the following steps of:
- determining (step E0) the round trip time for a connection establishment request from the client terminal C to a server S (so called TCP-RTT as illustrated on FIGS. 4A and 4B);
- measuring (step E1) the reception delay $Delay_{Rx}$ between the emission of a request for a given chunk $I_n$ of the multimedia content, with a given representation r, and the beginning of the reception of said requested chunk $I_n$;
- comparing (step E2) the determined round trip time of the connection establishment request TCP-RTT with the measured reception delay $Delay_{Rx}$.

When the requested chunk $I_n$ is in the cache R (to be detected), the reception delay $Delay_{Rx}$ might comprise:
- the round trip time HTTP-RTT for requesting the given chunk $I_n$ between the client terminal C and the cache R (as depicted in FIG. 4E);
- the time for the cache R to check availability of the requested chunk $I_n$;
- the time to fetch data from the cache R;
- the transfer time of the first data packet of chunk $I_n$.

All these times are expected to be short when the cache is properly located.

When the requested chunk $I_n$ is not loaded in the cache R, the reception delay $Delay_{Rx}$ comprises an additional delay made of:
- the round trip time HTTP-RTT for requesting the given chunk $I_n$ between the cache R and the server S (as shown on FIG. 4D);
- the time for the server S to fetch the chunk $I_n$;
- the transfer time of the first data packet from the server S to the cache R.

This additional delay is generally much longer than the previous one because:
- the number of hops to the server S may be great, leading to a large RTT, each routing node being a potential for congestion;
- TCP bandwidth can dramatically drop down if congestion occurs somewhere in the path;
- the server S has a lot of clients and can be overloaded.

In case the difference between the measured reception delay $Delay_{Rx}$ and the determined round trip time of the connection establishment request TCP-RTT is at least equal to a first detection threshold Th1 different from 0 (namely $Delay_{Rx} - TCPRTT \geq Th1 \neq 0$), a cache R is detected along the transmission path between the client terminal C and the server S. The requested given chunk $I_n$ is not stored in the detected cache R (as shown on FIG. 4D).

In case the difference between the measured reception delay $Delay_{Rx}$ and the determined round trip time of the connection establishment request TCP-RTT is lower than the first detection threshold (namely $Delay_{Rx} - TCPRTT < Th1$):
- either a cache R is present along the transmission path between the client terminal C and the server S, and the requested given chunk $I_n$ comes from the cache R (as shown on FIG. 4E);
- or there is no cache along the transmission path between the client terminal C and the server S, and the requested given chunk $I_n$ comes from the server S (as shown on FIG. 4C).

By comparing the subsequent $Delays_{Rx}$, the cache detector 7 might know if a requested chunk comes from the same source than a previous received chunk, whatever it was from the server S or from the cache R.

It has also to be noted that, for a given chunk, when a cache has been detected along the transmission path, the information regarding the presence of such a cache might be later reused.

Moreover, in a variant, the cache detector 7 of the client terminal C might implement a second mechanism M2 for detecting a cache R between the client terminal C and the server S.

Figure 5:
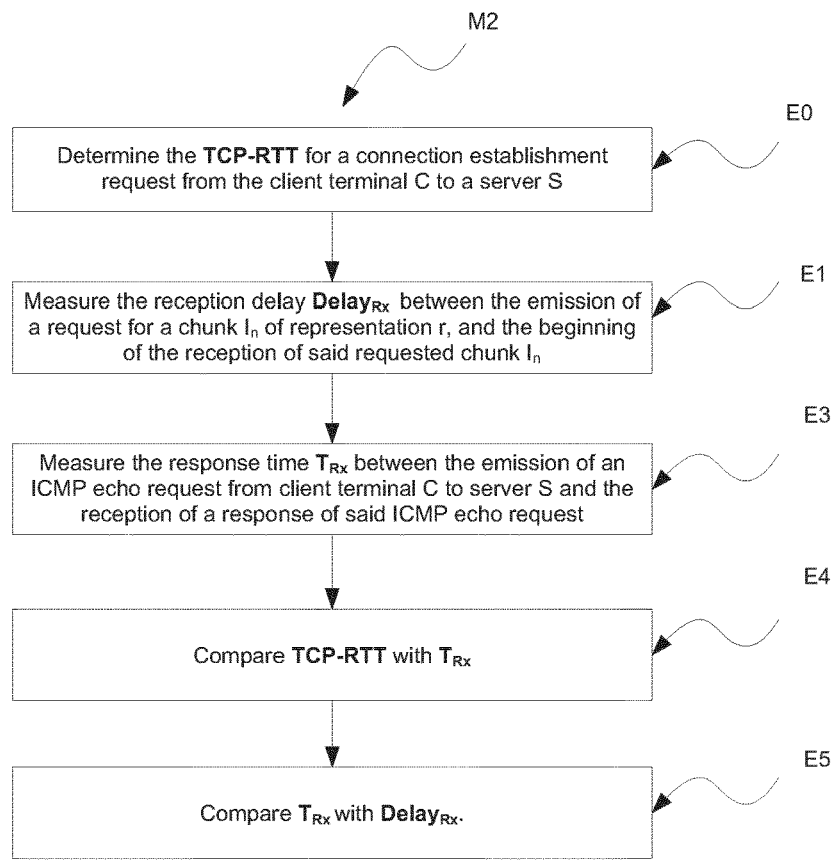
FIG. 5 represents a flow chart depicting a second cache detection mechanism implemented by the client terminal of FIG. 2.

As shown on FIG. 5, said second mechanism M2 comprises steps E0 and E1 of the first mechanism M1 and the further steps of:
- measuring (step E3) the response time $T_{Rx}$ between the emission of an Internet Control Message Protocol echo request (so called ICMP echo) from the client terminal C to the server S and the reception of a response to said ICMP echo request;
- comparing (step E4) the determined round trip time TCP-RTT of the connection establishment request with the response time $T_{Rx}$;
- comparing (step E5) the measured response time $T_{Rx}$ with the measured reception delay $Delay_{Rx}$.

When the difference between the measured response time $T_{Rx}$ and the determined round trip time TCP-RTT of the connection establishment request is at most equal to a second detection threshold Th2 (e.g. with a value close to zero), namely $|T_{RX} - TCPRTT| \leq Th2 \approx 0$, no cache is detected along the transmission path between the client terminal C and the server S, the chunk $I_n$ comes from the server S.

By contrast, when the difference between the measured response time $T_{Rx}$ and the determined round trip time TCP-RTT of the connection establishment request is at least equal to a third detection threshold Th3 different from 0, namely $T_{Rx} - TCPRTT \geq Th3 \neq 0$, a cache R is detected along the transmission path between the client terminal C and the server S, and the chunk $I_n$ is:
- loaded in the detected cache R, in case the difference between the measured response time $T_{Rx}$ with the measured reception delay $Delay_{Rx}$ is at least equal to a fourth detection threshold (for instance half of the response time $T_{Rx}$), namely $$T_{Rx} - Delay_{Rx} \geq Th4 = \frac{T_{Rx}}{2};$$

or comes from the server S should the opposite occur.

The second mechanism M2 involves an explicit measure of the "distance" to the remote server S by sending an ICMP echo request to said server S and by measuring the response time $T_{Rx}$, since the cache R will not do anything of such an ICMP request.

Figure 4A:
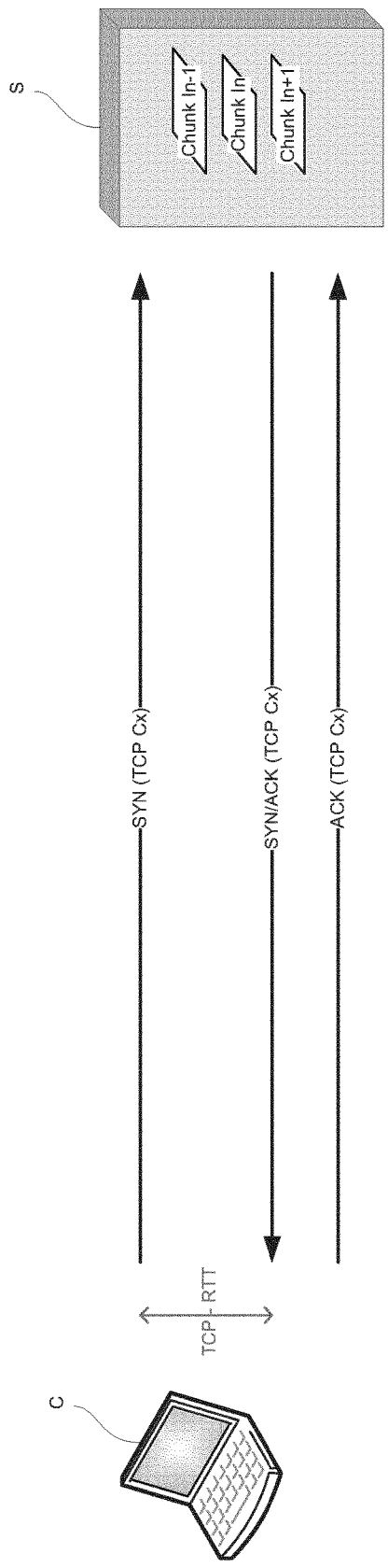
FIGS. 4A and 4B illustrates the TCP-RTT without cache (FIG. 4A) and with a cache located along the transmission path (FIG. 4B)
Figure 4B:
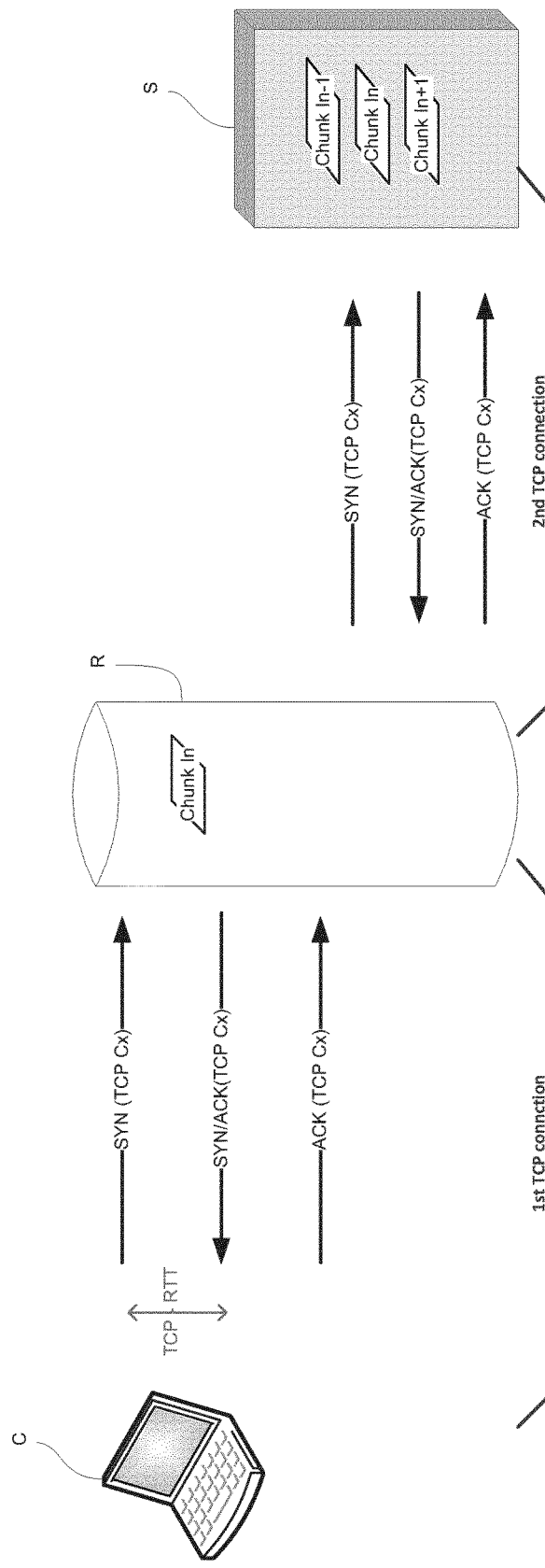

If TCP-RTT and $T_{Rx}$ are close, it means there is only one TCP connection directly to the server S (see FIG. 4A). If the cache R establishes a double TCP connection (see FIG. 4B), the complete RTT of the ICMP echo (namely $T_{Rx}$) is much larger.

In addition, it might be appreciated that both mechanisms can be combined to get better confidence on the cache detection. Several measures of the above mentioned parameters can be realized to limit the risk of errors due, for instance, to temporary network congestion.

Besides, the bandwidth estimator 8 of the client terminal C if configured to estimate the available bandwidth of the transmission path thanks to the above mentioned formula:

$$BW_n = \alpha BW_{n-1} + (1-\alpha)D_n$$

When the client terminal C knows whether a chunk $I_n$ is received through a cache R or from a remote server S thanks to the cache detector 7, the bandwidth estimator 8 is configured to keep separate values of reception delay $Delay_{Rx}$ and peak rate for both situations (chunk $I_n$ is cached, chunk $I_n$ comes from server S) and to maintain two different values for the bandwidth estimation:

one value $BW_{server}$ for the transmission path "client terminal C to server S";

one value $BW_{cache}$ for the transmission path "client terminal C to detected cache R".

The bandwidth estimation might be updated upon receipt of detection information from the cache detector 7 of the client terminal C.

In a further aspect, since the peak rate is mainly influenced by the "last mile" access link and/or by the use of a wireless home link, if client terminal C observes a peak rate decrease, it may be assumed a similar decrease for both situations, so that both estimations might be updated to take into account the peak rate decrease.

According to the preferred embodiment, in case a cache R has been detected, the decision module 9 implements the following decision process to decide—depending on the performance criterion—to request a next chunk $I_{n+1}$ with:

the same representation r as the one of chunk $I_n$ stored in the cache R, in order to maximize the probability to stay in said cache R, whatever the result of bandwidth estimation. In this case, the decision module 9 might request a representation with an associated bitrate which is not the closest below the bandwidth estimation. Robustness is thus preferred—through caching—to maximum quality; or an alternative representation r' (different from the one of chunk $I_n$) taking into account the bandwidth estimation (e.g. $BW_{cache}$ in case chunk $I_n$ is cached, $BW_{server}$ in case chunk $I_n$ comes from server S). Said alternative representation r' might advantageously depend on the bandwidth estimation. In case the alternative representation r' is defined with a higher bitrate than the current representation r of chunk $I_n$, the quality is preferred to robustness.

According to a further aspect of the preferred embodiment, the request of the next chunk $I_{n+1}$ with the same representation r or with an alternative representation r' might advantageously comprise a piece of information understandable by said detected cache R (for instance the "only-if-cached" HTTP header), so that, in case the next chunk $I_{n+1}$ is not stored in the detected cache R, the client terminal C receives a message specifying that said next chunk $I_{n+1}$ is not available in the cache R. This allows a limited delay penalty to test the availability in the cache R of a further chunk. If an alternative representation r' is not available in cache R, the client terminal C can request again the chunk $I_{n+1}$ with the representation r.

As for example, the performance criterion might be selected by an end user of the client terminal C, so as to select her/his preferences, e.g. the quality of the multimedia content, the speed of downloading, etc. In a variant, said performance criterion might be defined automatically with respect to the category of the multimedia content (e.g. sport event, movie, documentaries, etc.). Obviously, in another variant, one or more additional criteria might be used.

In a further aspect of the preferred embodiment, when the downloading of the multimedia content from the detected cache R meets a downloading criterion (e.g. the downloading from the cache is fast enough so that the buffer 6 of the client terminal C is full), the decision module 9 might request a further chunk $I_k$ of said multimedia content with a new representation r''—which should differ from the representation r of chunk $I_n$—in order to attempt a representation change (e.g. higher quality) and determine whether this new representation r'' is sustainable (meaning that next chunk $I_k$ will arrive on time and that the next bandwidth estimation allows to continue with this new representation r'') or not. In case the new representation r'' is not sustainable, the detection module 9 switches back to the previous cached representation r.

In an additional aspect of the preferred embodiment, a flag list for all representations of the multimedia content might be stored in the client terminal C, said flag list indicating whether a representation has been previously detected in the cache R or not. When the detection module 9 wishes to change the current representation r, such a flag list might provide an indication of the chance to find it in detected cache R.

It might be appreciated that depending on the ratio between bandwidth estimation with ($BW_{cache}$) or without cache ($BW_{server}$), selecting a bitrate just below cache, the current one may lead to reception conditions worse than the current ones when the current chunk $I_n$ is in the cache R and the next chunk $I_{n+1}$ is not. The decision module 9 might thus decide to select a much lower bitrate to compensate the non-cache penalty.

Figure 6:
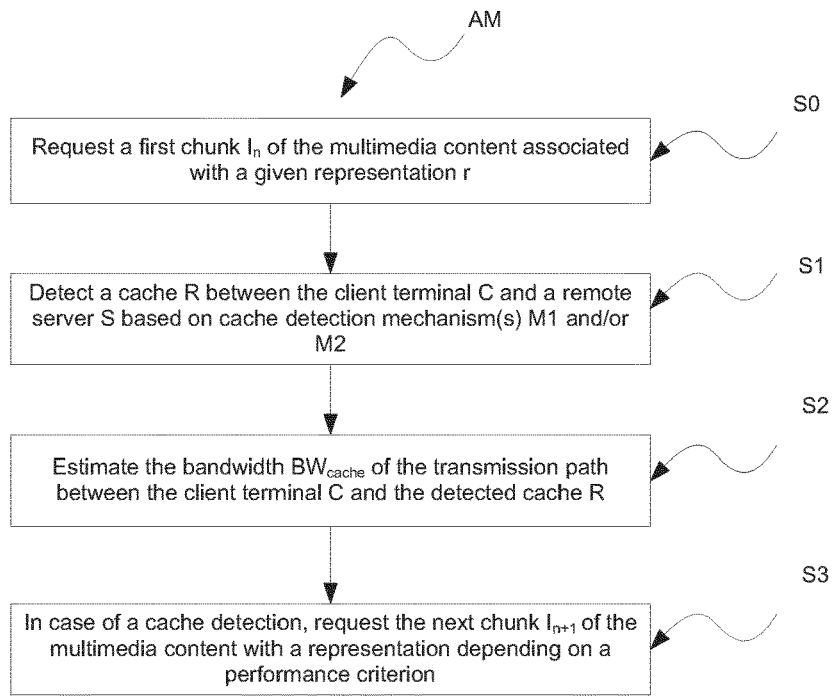
FIG. 6 is a flow chart illustrating the method for adapting the downloading behavior implemented by the client terminal of FIG. 2.

According to the present invention, and as shown on FIG. 6, the client terminal C is configured to adapt its downloading behavior for receiving a given multimedia content from the network N2. In particular, the client terminal C can implement the following adaptation method AM comprising the steps of:

requesting (step S0) a first chunk $I_n$ of the multimedia content with a given representation r;

detecting (step S1) a cache R between the client terminal C and a remote server S comprising said given multimedia content based on the cache detection mechanism(s) M1 and/or M2;

estimating (step S2) the bandwidth $BW_{cache}$ of the transmission path between the client terminal C and the detected cache R;

in case a cache R has been detected in step S1, requesting (step S3) the next chunk $I_{n+1}$ of the multimedia content with a representation r', r' depending on a performance criterion, according to the decision process as above described.

Thanks to the present invention, the behavior of the HTTP Adaptive Streaming client terminal can be adapted in order to detect the presence of the cache along the transmission path and to adjust its decision process accordingly. The Quality of Experience (QoE) of an end user might be improved.

Indeed, when the requested chunk $I_n$ (chunk n of representation r) is already present in the detected cache R, there is a high probability to have the next chunk at the same rate (chunk $I_{n+1}$ of representation r) also loaded in the cache R. It may be advantageous, in some cases, to keep the same representation r and request this particular chunk (chunk $I_{n+1}$ of representation r). The evident benefit in such case can be the reuse of cached chunks, which results in a smooth playback experience and a significant reduction of the traffic between the cache R and the server S. Other decisions can be made based on the knowledge of the presence of a cache R.

Besides, it should also be understood that a detected cache might correspond to an internal cache of the gateway GW allowing:
previously requested chunks of the multimedia content to be downloaded faster;
over-the-top operators to provision the internal cache of the gateway with their content to improve the user experience.

References disclosed in the description, the claims and the drawings may be provided independently or in any appropriate combination. Features may, where appropriate, be implemented in hardware, software, or a combination of the two.

Reference numerals appearing in the claims are by way of illustration only and shall have no limiting effect on the scope of the claims.

This invention having been described in its preferred embodiment, it is clear that it is susceptible to numerous modifications and embodiments within the ability of those skilled in the art and without the exercise of the inventive faculty. Accordingly, the scope of the invention is defined by the scope of the following claims.

In the claims hereof, any element expressed as a means for performing a specified function (e.g. cache detector 7, bandwidth estimator 8, decision module 9, etc.) is intended to encompass any way of performing that function including, for example, a) a combination of circuit elements (for instance one or more processors) that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

The invention claimed is:

1. A method for adapting downloading behavior of a client terminal configured to receive a multimedia content from at least one server, at least one representation of said multimedia content being available, said method comprising, at said client terminal:
requesting a first part of said multimedia content with a given representation;
detecting whether a cache is located along a transmission path between the client terminal and a server, from the request of said first part; and
when the cache is detected, requesting a second part of said multimedia content with a representation depending on at least one performance criterion.

2. The method according to claim 1, further comprising: estimating bandwidth of the transmission path between the client terminal and the detected cache.

3. The method according to claim 2, wherein, according to said performance criterion, the requested second part of said multimedia content is defined by:
either the same representation as the first part stored in said detected cache, based on a result of the bandwidth estimation;
or an alternative representation taking into account the estimated bandwidth, said alternative representation being different from the representation of the first part.

4. The method according to claim 1, wherein the request of said second part comprises a piece of information understandable by said detected cache, so that, when said second part is not stored in the detected cache, the client terminal receives a message specifying that said second part is unavailable from said cache.

5. The method according to claim 1, wherein the method further comprises:
in case a downloading of said multimedia content from the detected cache meets at least one downloading criterion, requesting a further part of said multimedia content with a new representation, which differs from the representation of said first part.

6. The method according to claim 1, wherein detecting the cache further comprises:
determining a round trip time for a connection establishment request from the client terminal to the server.

7. The method according to claim 6, wherein detecting the cache further comprises:
measuring a reception delay between an emission of the request for the first part of the multimedia content and a beginning of reception of said requested first part.

8. The method according to claim 7, wherein detecting the cache further comprises:
comparing the determined round trip time of the connection establishment request and the measured reception delay.

9. The method according to claim 7, wherein detecting the cache further comprises:
measuring a response time between an emission of an echo request from the client terminal to the server and a reception of a response to said echo request; and
comparing the determined round trip time of the connection establishment request with the response time.

10. A client terminal configured to adapt a downloading behavior for receiving a multimedia content from at least one server, at least one representation of said multimedia content being available, comprising:
a processor communicatively coupled to a memory module and configured to receive multimedia content from at least one server;
a communication module for requesting a first part of said multimedia content with a given representation;
a cache detector for detecting when a cache is located along a transmission path between the client terminal and a server, from the request of said first part; and a decision module for requesting, in case the cache is detected, a second part of said multimedia content with a representation depending on at least one performance criterion.

11. The client terminal according to claim 10, further comprising a bandwidth estimator for estimating bandwidth of the transmission path between said client terminal and the detected cache.

12. The client terminal according to claim 10, wherein, according to said performance criterion, the requested second part of said multimedia content is defined by:
   either the same representation as the one of the first part stored in said detected cache, based on a result of the bandwidth estimation;
   or an alternative representation taking into account the estimated bandwidth, said alternative representation being different from the representation of the first part.

13. The client terminal according to claim 10, wherein the request of said second part comprises a piece of information understandable by said detected cache, so that, in case said second part is not stored in the detected cache, the client terminal receives a message specifying that said second part is unavailable from said cache.

14. The client terminal according to claim 10, wherein the terminal is further configured to request a further part of said multimedia content with a new representation, which differs from the representation of said first part, in case the downloading of said multimedia content from the detected cache meets at least one downloading criterion.

* * * * *